US012161985B2

(12) United States Patent
Mosleh et al.

(10) Patent No.: US 12,161,985 B2
(45) Date of Patent: Dec. 10, 2024

(54) ALCOHOL-BASED ORGANOGEL AS NANOFLUID MEDIUM

(71) Applicant: HOWARD UNIVERSITY, Washington, DC (US)

(72) Inventors: Mohsen Mosleh, Bethesda, MD (US); Mousab Ahmed, Washington, DC (US); Preethi Chandran, Washington, DC (US); Marjan Alaghmand, Rockville, MD (US)

(73) Assignee: Howard University, Washington, DC (US)

( * ) Notice: Subject to any disclaimer, the term of this patent is extended or adjusted under 35 U.S.C. 154(b) by 0 days.

(21) Appl. No.: 17/307,515

(22) Filed: May 4, 2021

(65) Prior Publication Data

US 2021/0346858 A1 Nov. 11, 2021

Related U.S. Application Data

(60) Provisional application No. 63/020,272, filed on May 5, 2020.

(51) Int. Cl.
C10M 105/12 (2006.01)
B01J 13/00 (2006.01)
C10M 115/04 (2006.01)
C10M 125/02 (2006.01)
C10M 125/04 (2006.01)
(Continued)

(52) U.S. Cl.
CPC ........ B01J 13/0065 (2013.01); C10M 105/12 (2013.01); C10M 115/04 (2013.01); C10M 125/02 (2013.01); C10M 125/04 (2013.01); C10M 125/20 (2013.01); C10M 125/22 (2013.01); C10M 171/02 (2013.01);
(Continued)

(58) Field of Classification Search
CPC .......... B01J 13/0065; C10M 105/12; C10M 115/04; C10M 125/02; C10M 125/04; C10M 125/20; C10M 125/22; C10M 171/02; C10M 171/06; C10M 169/00; C10M 2201/041; C10M 2201/061; C10M 2201/065; C10M 2201/066; C10M 2207/021; C10M 2207/0215; C10M 2207/1256; B82Y 40/00; B82Y 30/00; C10N 2020/06; C10N 2050/01; C10N 2010/02; C10N 2050/10
See application file for complete search history.

(56) References Cited

U.S. PATENT DOCUMENTS 9,840,679 B2    12/2017  Mosleh et al.
2016/0017253 A1 *  1/2016  Mosleh .................... C09C 1/44
                                                                  508/122

FOREIGN PATENT DOCUMENTS

CN    104812879 A  *  7/2015  .......... C10M 141/06
JP    2007302754 A  *  11/2007

* cited by examiner

Primary Examiner — Taiwo Oladapo
(74) Attorney, Agent, or Firm — Sughrue Mion, PLLC

(57) ABSTRACT

An organogel including a base fluid, cetyl alcohol, and a gelling agent provided in an amount to cause the fluid to change from a liquid state to a gelled state at temperatures below at least 25° C. A nanofluid including an organogel and a nanoparticle component which permits the nanofluid to change from a liquid state to a gelled state at temperatures below at least 25° C., the gelled state helping to maintain the nanoparticle component suspended throughout the base fluid; and a method for preparing a gelled nanofluid.

8 Claims, 7 Drawing Sheets
(4 of 7 Drawing Sheet(s) Filed in Color)

(51) Int. Cl.
C10M 125/20 (2006.01)
C10M 125/22 (2006.01)
C10M 171/02 (2006.01)
C10M 171/06 (2006.01)
*B82Y 40/00* (2011.01)
*C10N 20/06* (2006.01)
*C10N 50/00* (2006.01)

(52) U.S. Cl.
CPC ............ C10M 171/06 (2013.01); *B82Y 40/00* (2013.01); *C10N 2020/06* (2013.01); *C10N 2050/01* (2020.05)

(0 Min)　(20 Min)　(40 Min)　(60 Min)　(80 Min)

(0 Min)　(3 Min)　(6 Min)　(9 Min)　(15 Min)

(0 Min) (20 Min) (40 Min) (60 Min) (80 Min)

(0 Min) (10 Min) (20 Min) (30 Min) (60 Min)

(0 Min)  (25 Min)  (50 Min)  (75 Min)

(0 Min)  (5 Min)  (10 Min)  (15 Min)

(0 Min)　　(25 Min)　　(50 Min)　　(75 Min)

(0 Min)　　(10 Min)　　(15 Min)　　(20 Min)

ALCOHOL-BASED ORGANOGEL AS NANOFLUID MEDIUM

CROSS REFERENCE TO RELATED APPLICATIONS

This application claims benefit to U.S. Provisional Application No. 63/020,272 filed May 5, 2020, the entire content of which is incorporated herein by reference.

TECHNICAL FIELD

The present application relates to an alcohol-based organogel as a medium for temperatures-sensitive nanofluid gels.

BACKGROUND

In recent years, the study of gels has attracted interest due to various applications in the in-situ preparation and stabilization of nanomaterials (Kobayashi, et al. "Preparation of Helical Transition-Metal Oxide Tubes Using Organogelators as Structure-Directing Agents," vol. 1, pp. 6550-6551, 2002; Ray, et al. "Smart oligopeptide gels: In situ formation and stabilization of gold and silver nanoparticles within supramolecular organogel networks," Chem. Commun., no. 26, pp. 2816-2818, 2006; Hu, et al. "Chemistry and physics in one dimension: Synthesis and properties of nanowires and nanotubes," Acc. Chem. Res., vol. 32, no. 5, pp. 435-445, 1999; Van Bommel, et al. "Organic templates for the generation of inorganic materials," Angew. Chemie—hit. Ed., vol. 42, no. 9, pp. 980-999, 2003; Soler-hlia, et al. "Chemical strategies to design textured materials: From microporous and mesoporous oxides to nanonetworks and hierarchical structures," Chem. Rev., vol. 102, no. 11, pp. 4093-4138, 2002), drug-delivery systems (Ray, et al. "pH-responsive, bolaamphiphile-based smart metallo-hydrogels as potential dye-adsorbing agents, water purifier, and vitamin B 12 carrier," Chem. Mater., vol. 19, no. 7, pp. 1633-1639, 2007; Bastiat, et al. "Pharmaceutical organogels prepared from aromatic amino acid derivatives," J. Mater. Chem., vol. 19, no. 23, pp. 3867-3877, 2009), and energy transfer and light harvesting materials (Ajayaghosh, et al. "Organogels as scaffolds for excitation energy transfer and light harvesting," Chem. Soc. Rev., vol. 37, no. 1, pp. 109-122, 2008; Ajayaghosh, et al. "Gelation-Assisted Light Harvesting by Selective Energy Transfer from an Oligo (phenylenevinylene)-Based Self-Assembly to an Organic Dye" Chem. Int. Ed. 2003, 42, 332-335; Nakashima, et al. "Light-harvesting supramolecular hydrogels assembled from short-legged cationic L-Glutamate derivatives and anionic fluorophores," Adv. Mater., vol. 14, no. 16, pp. 1113-1116, 2002).

An emerging application of gels is in the field of nanofluids for nanolubrication (Mosleh, et al. "Gelling nanofluids for dispersion stability", U.S. Pat. No. 9,840,679, Dec. 12, 2017). It has been demonstrated that nanofluids with dispersed nanoparticles exhibit enhanced lubrication and heat transfer properties compared with the base fluid. As such, cutting nanofluids containing nanoparticles such as molybdenum disulfide ($MoS_2$), tungsten carbide (WC), hexagonal boron nitride (hBN), graphite, carbon nanotubes (CNT), and nanodiamond have been used for improved surface quality and longer tool life in operations such as turning, drilling, grinding, milling, and forming (Mosleh, et al. "Modification of sheet metal forming fluids with dispersed nanoparticles for improved lubrication", Wear, 267 (5-8), 1220-1225, 2009; Sharma, et al. "Progress of Nanofluid Application in Machining: A Review, Materials and Manufacturing Processes", 30:7, 813-828, 2015, DOI: 10.1080/10426914.2014.973583; Krishna, et al. "Experimental investigation on the performance of nanoboric acid suspensions in SAE-40 and coconut oil during turning of AISI 1040 steel", INT J MACH TOOL MANU. 50 (10), 911-916, 2010; Vasu, et al. "Analysis of nanofluids as cutting fluid in grinding EN-31 steel", NANO-MICRO LETT. 3 (4), 209-214, 2011; Mosleh, et al. "Performance of cutting nanofluids in tribological testing and conventional drilling", J MANUF PROCESS. 25, 70-76, 2017; Rahmati, et al. "Investigating the optimum molybdenum disulfide ($MoS_2$) nanolubrication parameters in CNC milling of AL6061-T6 alloy", INT J ADV MANUF TECHNOL. 70(5-8), 1143-1155, 2014; Moura, et al. "The effect of application of cutting fluid with solid lubricant in suspension during cutting of Ti-6A1-4V alloy", Wear. 332, 762-771, 2015; Paul, et al. "Grinding of WC—Co cermets using hexagonal boron nitride nano-aerosol", INT J REFRACT MET H. 78, 264-272, 2019).

However, poor suspension stability and quick settlement of nanoparticles in the solution hinder further use of nanofluids in real applications. To overcome the nanoparticle settlement and provide a long self-life for nanofluids, nanofluid gels were produced so that the settlement of nanoparticles in the base fluid is improved due to the inhibition of particle movement in the gel (Mosleh et al., supra, U.S. Pat. No. 9,840,679).

The general way to prepare gels is by cooling a solution that contains a small number of low molecular weight organic molecules below its gelation temperature (Abdallah, et al. "Organogels and low molecular mass organic gelators," Adv. Mater., vol. 12, no. 17, pp. 1237-1247, 2000). The formation of gels arises from noncovalent interactions including hydrogen bonds, n-n stacking, coordination bonds and van der Waals forces among the gelator molecules (Basit, et al. "Two-component hydrogels comprising fatty acids and amines: structure, properties, and application as a template for the synthesis of metal nanoparticles," Chem.—A Eur. J., vol. 14, no. 21, pp. 6534-6545, 2008; Mohmeyer, et al. "A new class of low-molecular-weight amphiphilic gelators," Chem.—A Eur. J., vol. 11, no. 3, pp. 863-872, 2005; Van Esch, et al. "New functional materials based on self-assembling organogels: From serendipity towards design," Chemie—Int. Ed, vol. 39, no. 13, pp. 2263-2266, 2000; Piepenbrock, et al. "Metal- and Anion-Binding Supramolecular Gels," pp. 1960-2004, 2010; George, et al. "Molecular organogels. Soft matter comprised of low-molecular-mass organic gelators and organic liquids," Acc. Chem. Res., vol. 39, no. 8, pp. 489-497, 2006). These forces can induce the formation of supermolecular aggregates. The supramolecular aggregates are entangled with each other through junction zone to form a 3D network, within which the solvent molecules are immobilized in gel networks.

Surfactants under certain conditions, or with certain additives, can assemble into microstructures which introduce viscoelasticity, and gel-like behavior to the solution (Trickett, et al. "Surfactant-based gels," Adv. Colloid Interface Sci., vol. 144, no. 1-2, pp. 66-74, 2008). Sodium carboxylate molecules such as sodium oleate (VNikiforidis, et al. "Organogel formation via supramolecular assembly of oleic acid and sodium oleate," pp. 47466-47475, 2015), sodium laurate (Wang, et al., "Self-assembly fibrillar network gels of simple surfactants in organic solvents," Langmuir, vol. 27, no. 5, pp. 1713-1717, 2011) and sodium stearate (Liang, et al. "Solvent-Induced Crystal Morphology Transformation in a Ternary Soap System: Sodium Stearate Crystalline Fibers and Platelets," no. 12, pp. 6447-6454, 2001) are surfactants and are reported to form gels in water, organic solvents and ionic liquids (Liang, et al. supra; Butler, et al. "'Delayed' phase separation in a gelatin/dextran mixture studied by small-angle light scattering, turbidity, confocal laser scanning microscopy, and polarimetry", Biomacromolecules, vol. 4, no. 4, pp. 928-936, 2003; Hao, et al. "Anisotropic ionogels of sodium laurate in a room-temperature ionic liquid", Langmuir, vol. 24, no. 7, pp. 3150-3156, 2008).

SUMMARY OF THE DISCLOSURE

The present inventors conducted extensive research and discovered a novel and innovative alcohol-based nanofluid which demonstrates a higher load capacity in extreme pressure testing and is suitable for lubrication and cooling applications such as cutting fluids. The alcohol-based organogels of the present disclosure are used as a medium for dispersion of nanoparticles such as $MoS_2$ and hBN with known solid lubrication properties to develop nanofluids. The temperature sensitive organogels of the present disclosure inhibit the settlement of nanoparticles at desired storage temperatures.

A first embodiment of the present disclosure relates to an organogel comprising: a base fluid, cetyl alcohol, and a gelling agent provided in an amount to cause the fluid to change from a liquid state to a gelled state at temperatures below at least 25° C.

The base fluid in the organogel is 2-hexyl-1-decanol or 2-n-octyl-1-dodecanol, or similar alcohols. The gelling agent in the organogel is sodium oleate.

The concentration of cetyl alcohol in the organogel may be 1% to 15% by weight based on the weight of the total organogel. The concentration of cetyl alcohol in the organogel may also be 2% to 13% or 5% to 10% by weight based on the total weight of the organogel. The concentration of the gelling agent in the organogel may be 0.1% to 2% by weight based on the total weight of the organogel. The concentration of the gelling agent in the organogel may also be 0.3% to 1.8% or 0.5% to 1.5% by weight based on the total weight of the organogel.

A higher concentration of cetyl alcohol in the organogel allows gelling at a higher temperature.

A second embodiment of the present disclosure relates to a nanofluid comprising: the organogel of the first embodiment and a nanoparticle component, which can change from a liquid state to a gelled state at temperatures below at least 25° C., the gelled state helping to maintain the nanoparticle component suspended throughout the organogel.

The nanoparticle component in the nanofluid is selected from the group consisting of molybdenum disulfide, nanodiamond, graphite, tungsten disulfide, hexagonal boron nitride, nanoparticles of materials with lamellar structure, and nanoparticles of soft metals, and combinations thereof.

The concentration of the nanoparticle component in the nanofluid is 0%-15% by weight, preferably 0.01%-14%, 0.1%-13%, or 1%-12% by weight, more preferably 1% to 8%, 2% to 6%, or 2.5% to 4% by weight, based on the weight of the nanofluid.

Another embodiment of the present disclosure relates to a method of preparing a gelling nanofluid, the method comprising the steps of: preparing an organogel by combining a base fluid, cetyl alcohol and a gelling agent, combining the organogel with a nanoparticle component at temperatures up to 50° C., to form a nanofluid; and cooling the nanofluid to a temperature of less than 25° C., the gelling agent in the organogel causes the nanofluid to change from a liquid state to a gelled state at temperatures below 25° C., the gelled state helping to maintain the nanoparticle component suspended throughout the base fluid.

The base fluid in the organogel is 2-hexyl-1-decanol or 2-n-octyl-1-dodecanol, or similar alcohols. The gelling agent in the method is sodium oleate.

The concentration of cetyl alcohol in the organogel is 1% to 15% by weight based on the total weight of the organogel. The concentration of the gelling agent in the organogel is 0.1% to 2% by weight based on the total weight of the organogel.

A higher concentration of cetyl alcohol used in the method allows gelling at a higher temperature.

The nanoparticle component used in the method is selected from the group consisting of molybdenum disulfide, nanodiamond, graphite, tungsten disulfide, hexagonal boron nitride, nanoparticles of materials with lamellar structure, and nanoparticles of soft metals, and combinations thereof.

The concentration of the nanoparticle component used in the method is 0%-15% by weight, preferably 0.01%-14%, 0.1%-13%, or 1%-12% by weight, more preferably 1% to 8%, 2% to 6%, or 2.5% to 4% by weight, based on the weight of the nanofluid.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

DETAILED DESCRIPTION OF THE DISCLOSURE

Figure 1A:
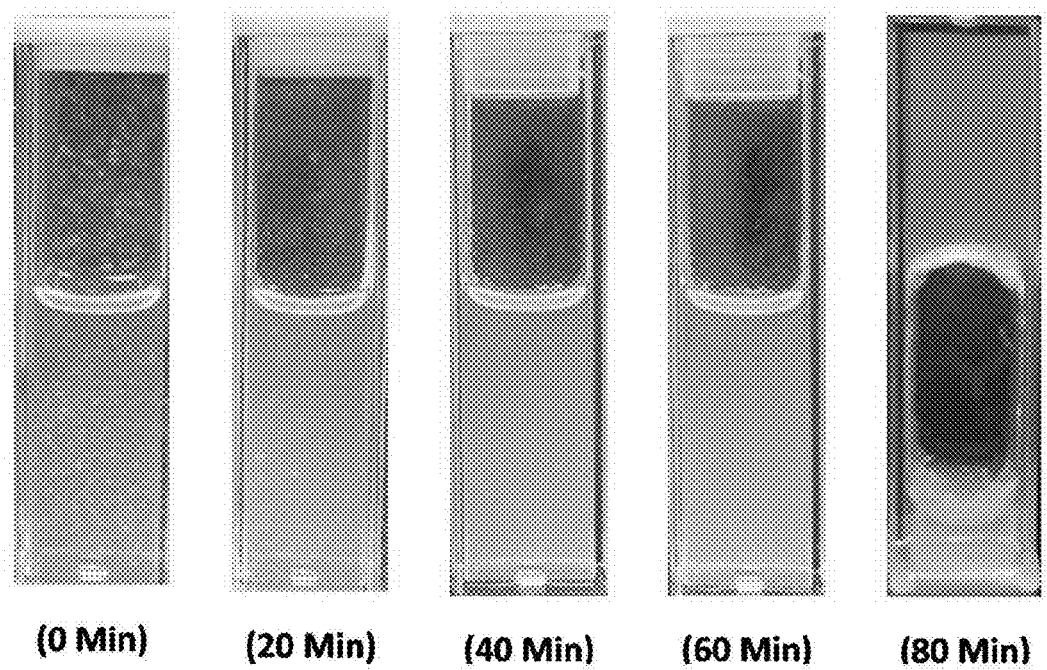
FIG. 1A shows gelling of organogels containing 10% cetyl alcohol (CA) and 1% sodium oleate (SO) at 25° C. in time intervals.
Figure 1B:
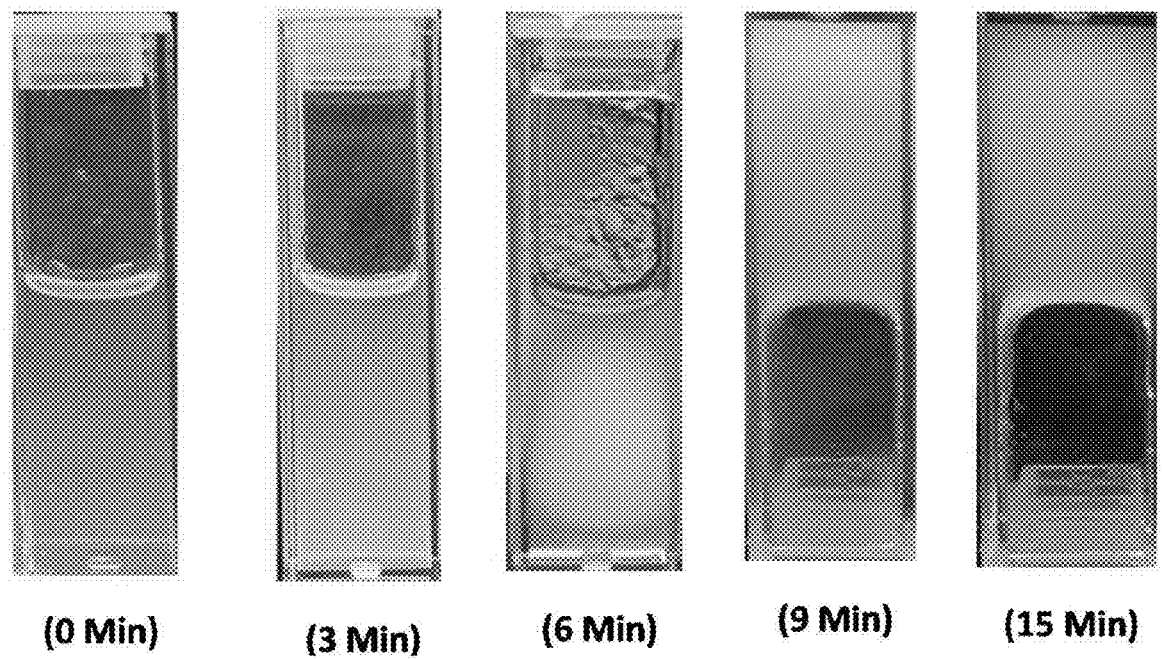
FIG. 1B shows gelling of organogels containing 10% cetyl alcohol (CA) and 1% sodium oleate (SO) at 10° C. in time intervals.
Figure 2A:
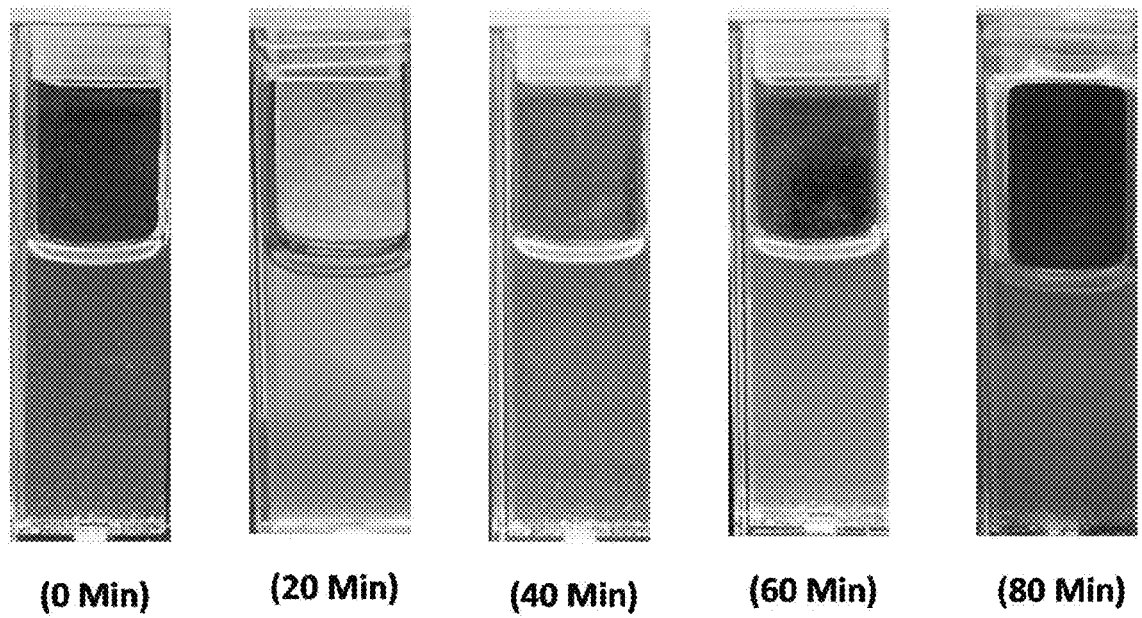
FIG. 2A shows gelling of organogels containing 5% CA and 1% SO at 25° C. in time intervals.
Figure 2B:
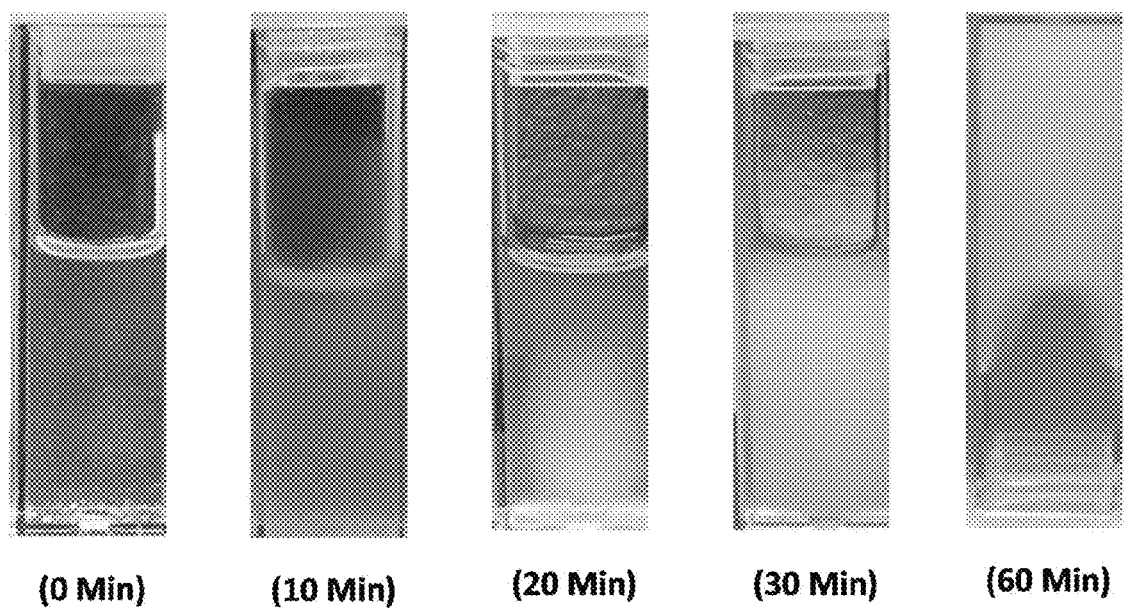
FIG. 2B shows gelling of organogels containing 5% CA and 1% SO at 10° C. in time intervals.
Figure 3A:
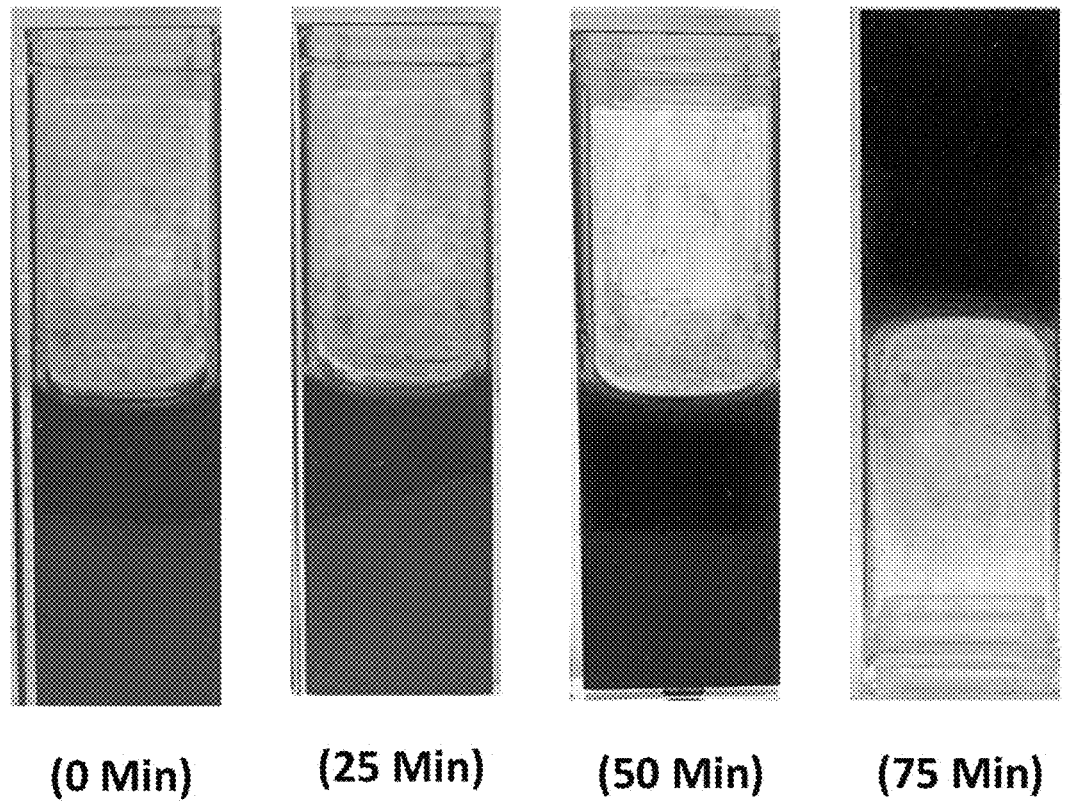
FIG. 3A shows gelling of nanofluids containing 10% CA+1% SO and 4% $MoS_2$ (molybdenum disulfide) nanoparticles at 25° C. in time intervals.
Figure 3B:
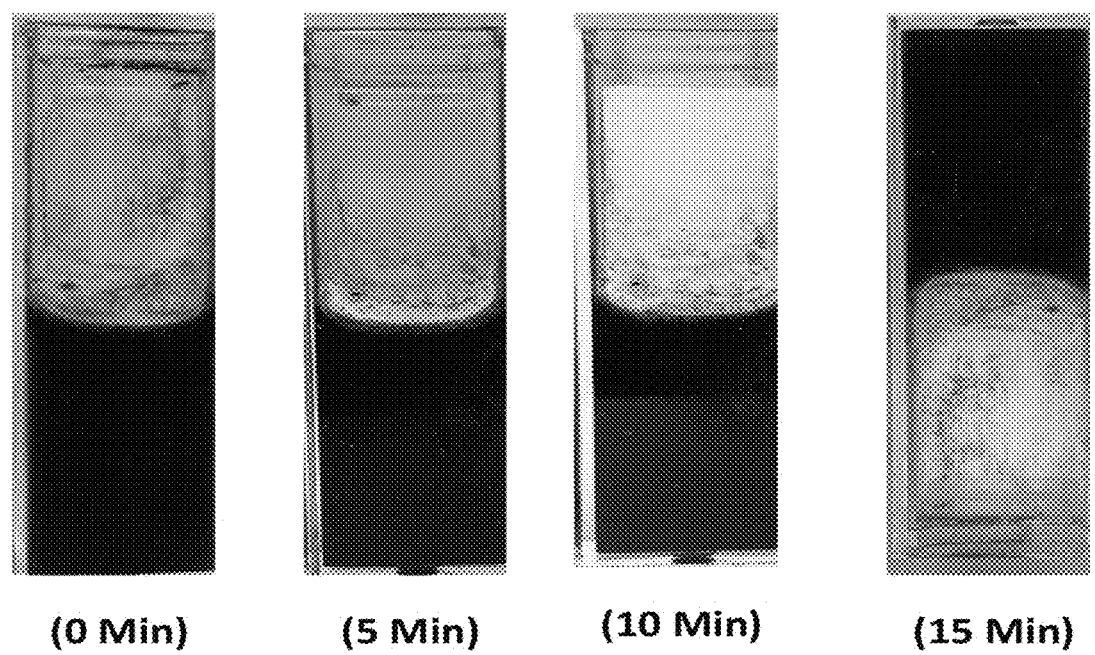
FIG. 3B shows gelling of nanofluids containing 10% CA+1% SO and 4% $MoS_2$ (molybdenum disulfide) nanoparticles at 10° C. in time intervals.
Figure 4A:
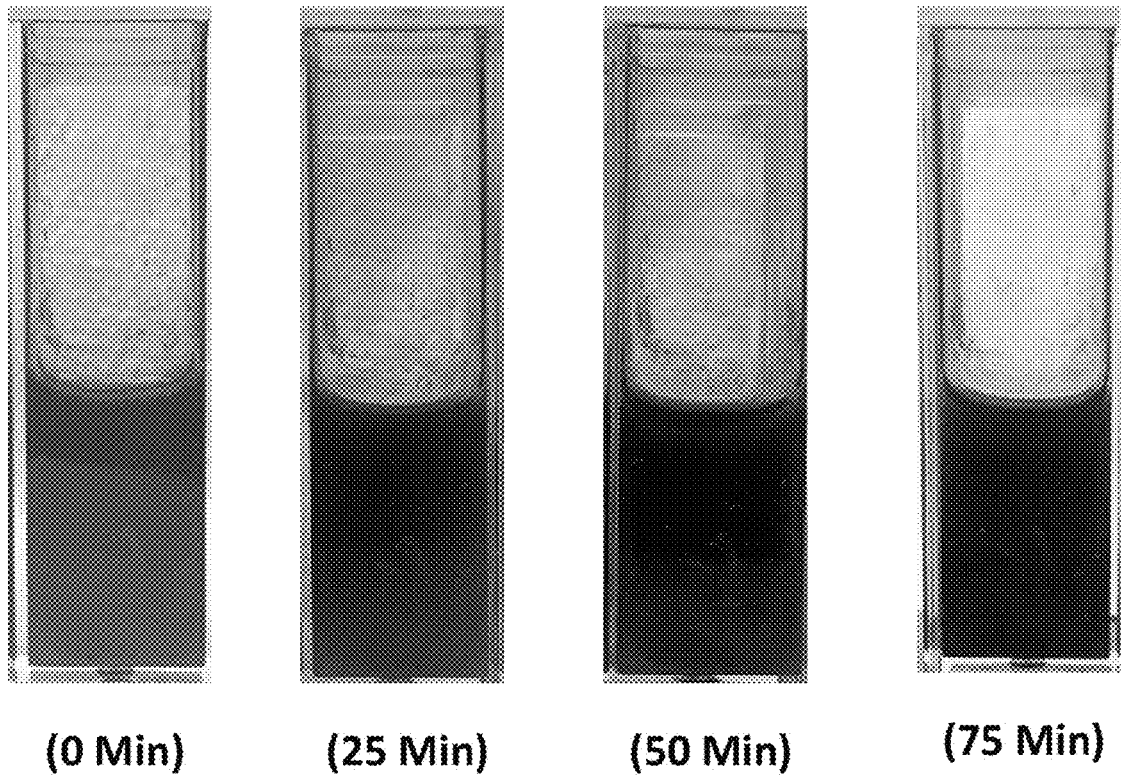
FIG. 4A shows gelling of nanofluids containing 5% CA+1% SO and 4% $MoS_2$ nanoparticles at 25° C. in time intervals.
Figure 4B:
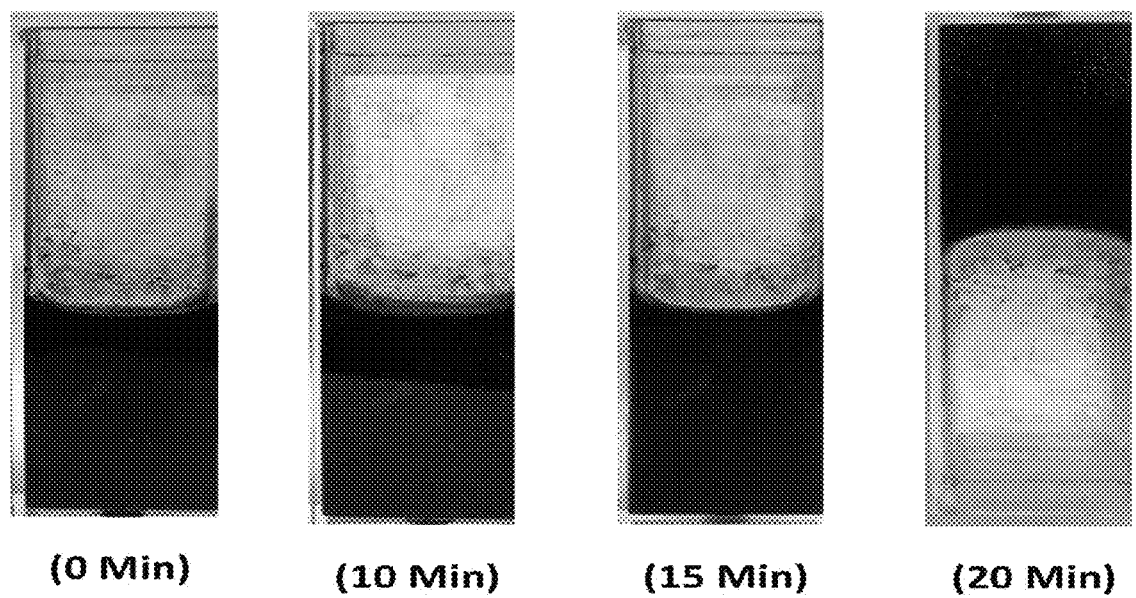
FIG. 4B shows gelling of nanofluids containing 5% CA+1% SO and 4% $MoS_2$ nanoparticles at 10° C. in time intervals.

The details of embodiments of the presently disclosed subject matter are set forth in the accompanying description below. Other features, objects, and advantages of the presently disclosed subject matter will be apparent from the specification, figures, and claims. All publications, patent applications, patents, and other references noted herein are incorporated by reference in their entirety.

The present disclosure relates to an alcohol-based organogel as a medium for temperatures-sensitive nanofluid gels. The alcohol-based organogel contains a base fluid, cetyl alcohol, and a gelling agent provided in an amount to cause the fluid to change from a liquid state to a gelled state at temperatures below at least 25° C.

The present disclosure also relates to a nanofluid containing the organogel and a nanoparticle component, which changes from a liquid state to a gelled state at temperatures below at least 25° C., the gelled state helping to maintain the nanoparticle component suspended throughout the base fluid.

Further, a method of preparing a gelling nanofluid is provided. The method includes the steps of: preparing an organogel by combining a base fluid, cetyl alcohol and a gelling agent, combining theorganogel with a nanoparticle component at temperatures up to 50° C., to prepare a nanofluid, and cooling the nanofluid to a temperature of less than 25° C. The nanofluid changes from a liquid state to a gelled state at temperatures below 25° C. The gelled state helps to maintain the nanoparticle component suspended throughout the base fluid.

The base fluid in the organogel may be 2-hexyl-1-decanol or 2-n-octyl-1-dodecanol, or similar alcohols. The gelling agent may be sodium oleate, alginic acid, sodium linoleate, or mixtures thereof.

For example, the alcohol-based organogel is formed from a solution of cetyl alcohol ($CH_3(CH_2)_{15}OH$) with a concentration range of 0-25% by weight in the solvent 2-hexyl-1-decanol ($C_{16}H_{34}O$) or 2-n-octyl-1-dodecanol at a temperature range of 30-50° C. The addition of sodium oleate ($C_{18}H_{33}O_2Na$)(SO) with a weight concentration of 0.1-5% by weight and the cooling down in the temperature range of 5-25° C. produced the alcohol-based organogel.

Selected nanoparticles such as molybdenum disulfide ($MoS_2$), nanodiamond, graphite, tungsten disulfide ($WS_2$), hexagonal boron nitride (hBN), nanoparticles of materials with lamellar structure, and nanoparticles of soft metals such as silver, with a concentration of 0-15% by weight based on the weight of the organogel, are dispersed in the solution by sonication before gelling. When cooled at the desired temperature, the resultant is a gelled nanofluid that inhibits nanoparticle settlement often encountered in typical nanofluids.

By controlling the percentage of the cetyl alcohol in the organogel, the temperature at which the nanofluid is gelled can be controlled. A higher concentration of cetyl alcohol used in the method allows gelling at a higher temperature. For instance, with 1% concentration of sodium oleate, the solution containing 10% cetyl alcohol gelled at 25° C. while the solution containing 5% cetyl alcohol did not gel at 25° C., but it gelled at 10° C. Similarly, for a given concentration of the cetyl alcohol in the organogel, the gelling temperature can be controlled by varying the percentage of sodium oleate from 0.1 to 2%. Thus, the storage temperature requirement of the resultant nanofluid can be controlled. The present alcohol-based nanofluid has demonstrated a greater that 20% higher load capacity in extreme pressure testing compared with the organogel without nanoparticles and is suitable for lubrication and cooling applications such as cutting fluids.

Examples

The present invention is explained below in further detail with reference to Examples. However, the scope of the invention is not limited to these Examples. Unless otherwise specified all parts and percentages are by weight, and the reported measurements and other data were obtained under ambient conditions.

Gel Preparation

Solutions containing various percentages of cetyl alcohol (CA; purchased from Fisher Scientific) from 1% to 15% by weight in 2-hexyl-1-decanol (HD; purchased from Sigma Aldrich) were initially made. HD has a molecular formula of $C_{16}H_{34}O$ and a molecular weight of 242.44 g/mol. CA has a molecular formula of $CH_3(CH_2)_{15}OH$ and a molecular weight of 242.44 g/mol. To ensure that cetyl alcohol is completely dissolved in the solution, the mixture was warmed up to 50° C. while it was mechanically stirred. It was then sonicated by a sonicator probe for 5 to 10 minutes, Then, the solution was cooled down to room temperature. The solution remained transparent as long as the cetyl alcohol percentage did not exceed 15% by weight. For concentrations higher than 15% by weight of CA in HD, the solution started to become translucent. The solution gelled when sodium oleate (SO; purchased from Sigma Aldrich) is added in the concentration range of 0.1%4% to the solution. SO has a molecular formula of $C_{18}H_{33}O_2Na$, and a molecular weight of 304.44 g/mol. SO forms bundles of cylindrical micelles which are made of SO fibers. The fibers dissolve and interact with CA molecules to form the gel. Cetyl alcohol has a longer chain than 2-hexa-1-decanol and therefore plays a critical role in gels formation because the solvophobic force of SO decreases with the increasing length of alcohol molecules. The gelator molecules (SO and CA molecules) interact with non-covalent interactions including hydrogen bonds, coordination bonds and van der Waals forces.

Rheology Measurements

A drop of the sample was placed on the Rheometer's controlled temperature plate, from 15 to 45° C. for 5 minutes. HR-3 Discovery Hybrid Rheometer was used to carry out the rheological measurements.

Extreme Pressure Test (EP)

In order to investigate the load-carrying properties of the alcohol-based organogel and the nanofluid in the liquid phase, extreme pressure testing (EP) according to ASTM D 2783-03 standard was carried out. Lubrication and Load-Carrying properties of organogel and nanofluids were carried out using Koehler TR-30H four-ball tester. In the test, a top ball was loaded on three lower balls and rotated against them under the applied load while the ball assembly was flooded with the organogel or nanofluid. A series of 10-second-duration tests were conducted at increasing loads until welding occurred. The rotating speed according to the EP test standard was 1760 rpm. It corresponds to 150 surface feet per minute (sfpm) sliding speed at the contact points.

Evaluation

The gel formation over time is shown for solutions containing 10% CA and 5% CA in FIGS. 1A-1B and 2A-2B, respectively. In both cases, the SO concentration was 1% by weight. As the temperature decreased from 25° C. (FIGS. 1A and 2A) to 10° C. (FIGS. 1B and 2B), the gelling time decreased. FIGS. 3A-3B and FIGS. 4A-4B show gel formation over time for nanofluids containing the organogel with addition of 4% by weight of molybdenum disulfide ($MoS_2$) nanoparticles. The organogel contained either 10% CA or 5% CA and 1% SO by weight. As the temperature decreased the gelling time also decreased.

Figure 5:
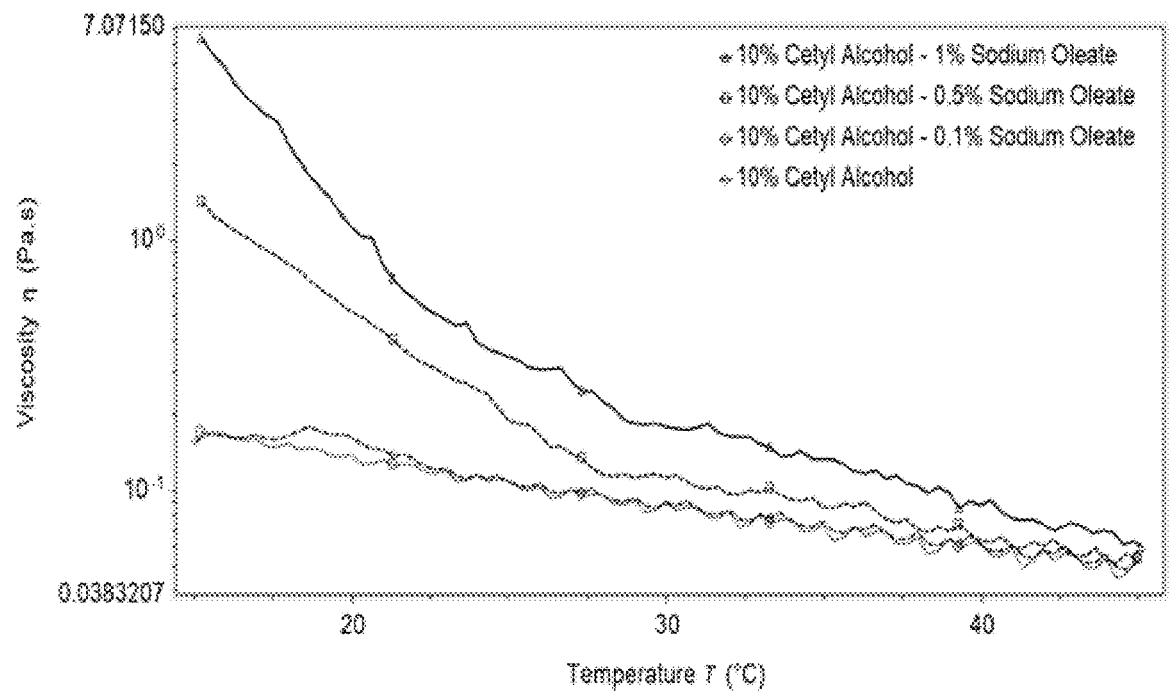
FIG. 5 shows viscosity of organogels containing 10% CA with varied concentration of SO, i.e., 0.1%, 0.5%, and 1%, against temperature; the control solution without SO is also shown.
Figure 6:
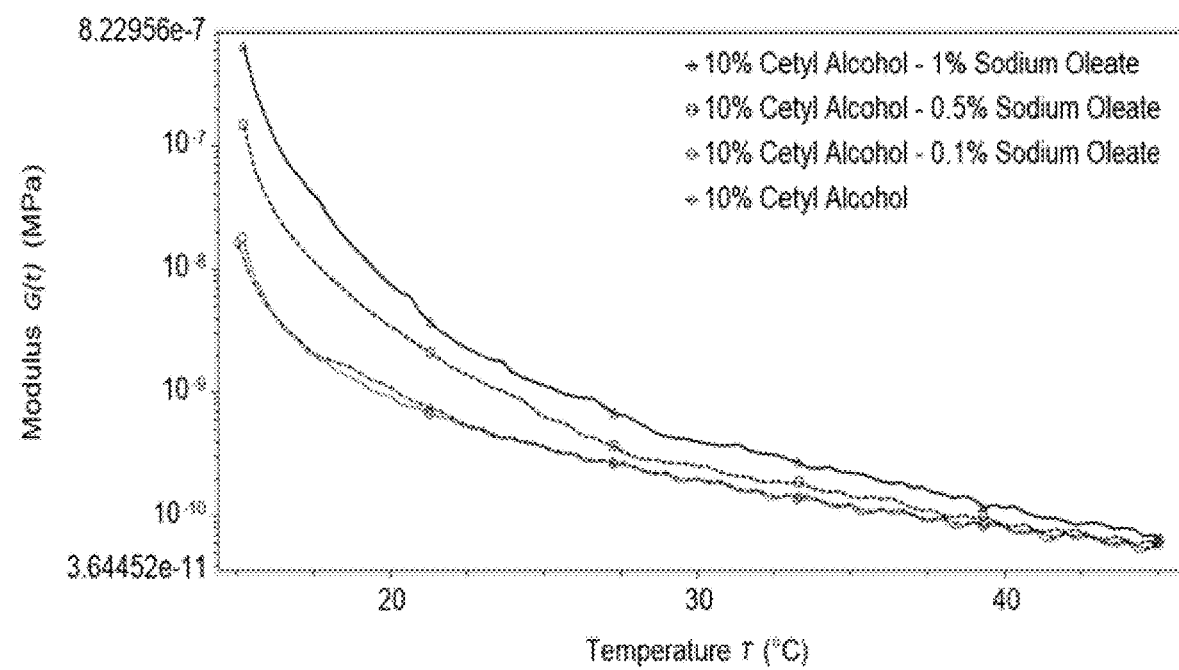
FIG. 6 shows elasticity of organogels containing 10% CA with varied concentration of SO, i.e., 0.1%, 0.5%, and 1%, against temperature; the control solution without SO is also shown.

The viscosity of the alcohol-based organogels was studied using a rheometer. FIG. 5 and FIG. 6 shows the viscosity and the modulus for the organogels containing 10% CA and varied concentrations of SO, i.e. 1%, 0.5% and 0.1%. The viscosity of the solution without any SO was also determined as a control (FIG. 5). As the concentration of SO is increased, the viscosity dependence on temperate changes from being linear to bilinear, with a clear transition temperature below which the viscosity increases with a sharp slope. The transition temperature shifts to a higher value as the concentration of SO increases. The modulus also shows a similar transition, but not with sharp slope changes and magnitude increases as the viscosity (FIG. 6).

Figure 7:
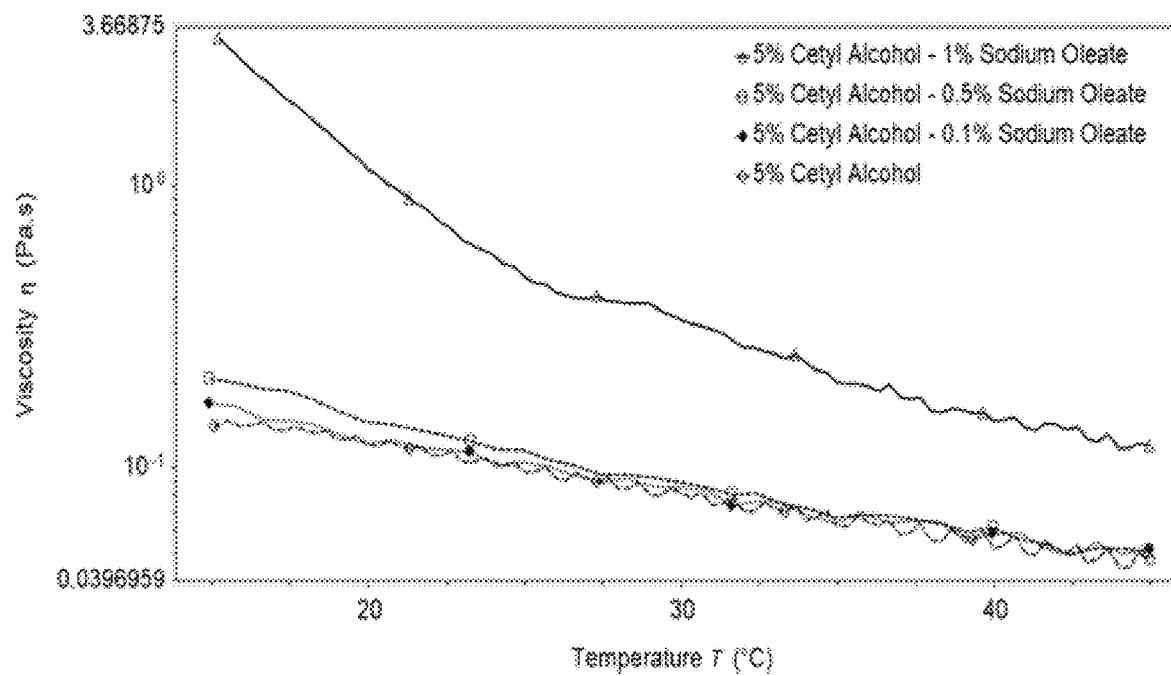
FIG. 7 shows viscosity changes for organogels containing 5% CA with varied concentration of SO, i.e. 0.1%, 0.5% & 0.1% against temperature; the control solution without SO is also shown.
Figure 8:
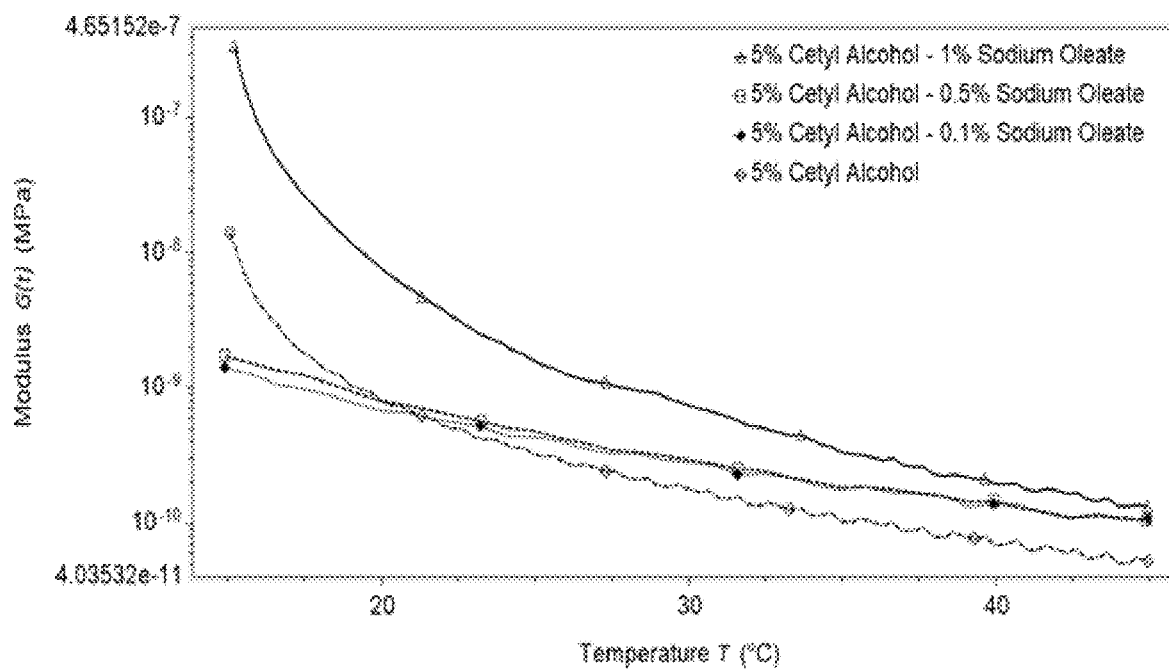
FIG. 8 shows modulus changes for organogels containing 5% CA with varied concentration of SO, i.e. 0.1%, 0.5% & 0.1% against temperature; the control solution without SO is also shown.
Figure 9:
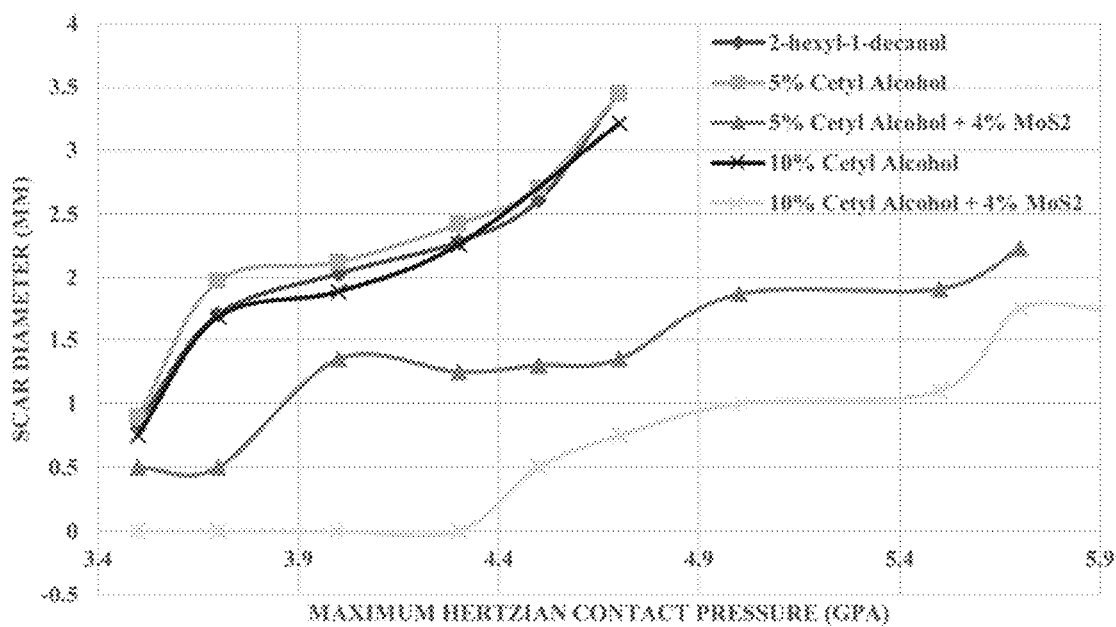
FIG. 9 shows the average scar diameter against the maximum Hertzian contact stress in extreme pressure (EP testing) for various solutions: the base fluid 2-hexyl-1-decanol (HD), the base fluid with 5% and 10% CA, the base fluid with 5% and 10% CA and 4% $MoS_2$.

FIGS. 7 and 8 show the temperature-dependence of the viscosity and the modulus, respectively, for the organogel containing 5% CA with varied concentrations of SO, i.e. 1%, 0.5% and 0.1%. In FIG. 7 it was noted that for 5% CA, SO concentrations less than 1% do not produce gelation. Accordingly, the viscosity profile for these lower concentrations is similar to the control (no SO), but it has a similar bilinear slope at the 1% SO concentration. The viscosity without any SO was measured and shown in FIG. 7 as a control. The modulus data shown in FIG. 8 also shows an increase in modulus when the SO concentration was 1.0%.
Lubrication and Load-Carrying Properties of Organogel and Nanofluids In order to investigate the load-carrying properties of the alcohol-based organogel and the nanofluid in the liquid phase, extreme pressure testing (EP) according to ASTM D 2783-03 standard was carried out. The results of the EP testing is presented in FIG. 9. The steel balls tested using as lubricant only the base fluid 2-hexyl-1-decanol (HD) and the base fluid 2-hexyl-1-decanol (HD) with 5% CA experienced rapid increase in the scar diameter at 4.7 GPa. This rapid increase is associated with the onset of welding and results in the stoppage of the testing. However, when HD solutions containing 5% CA is mixed with 4% $MoS_2$ nanoparticles, welding in not experienced even when the contact stress is increased to values of 5.0, 5.5, and 5.7 GPa.

2-Hexyl-1-decanol (HD) is used as a base fluid for the organogel in which various concentrations cetyl alcohol is dissolved. Then, by adding varied concentration of sodium oleate (SO), gelling of the solution is obtained. 2-Hexyl-1-decanol (HD) can be replaced by 2-n-octyl-1-dodecanol. The concentration of cetyl alcohol is 1% to 15% by weight. The concentration of the SO is 0.1% to 2%. The higher concentration of cetyl alcohol allows gelling at a higher temperature.

The alcohol-based organogels are used as medium for dispersion of nanoparticles such as $MoS_2$ and hBN with known solid lubrication properties to develop gelled nanofluids. The temperature sensitive organogels inhibit the settlement of nanoparticles at the desired storage temperatures.

While the subject matter disclosed herein has been described in connection with what is presently considered to be practical example embodiments, it is to be understood that the present disclosure is not limited to the disclosed embodiments, and covers various modifications and equivalent arrangements included within the spirit and scope of the appended claims.

What is claimed is:

1. An organogel comprising:
   a base fluid which is 2-hexyl-1-decanol or 2-n-octyl-1-dodecanol,
   cetyl alcohol, and
   a gelling agent provided in an amount to cause the fluid to change from a liquid state to a gelled state at temperatures below at least 25° C.,
   wherein the concentration of cetyl alcohol is 1% to 15% by weight based on the total weight of the organogel,
   the concentration of the gelling agent is 0.1% to 2% by weight based on the total weight of the organogel,
   the concentration of the base fluid in the organogel is 83% to 98.9% by weight based on the total weight of the organogel, and
   the gelling agent is sodium oleate.

2. The organogel according to claim 1, wherein a higher concentration of cetyl alcohol allows gelling at a higher temperature.

3. A nanofluid comprising:
   the organogel according to claim 1, and
   a nanoparticle component,
   wherein the nanofluid is configured to change from a liquid state to a gelled state at temperatures below at least 25° C., the gelled state helping to maintain the nanoparticle component suspended throughout the base fluid.

4. The nanofluid according to claim 3, wherein the nanoparticle component is selected from the group consisting of molybdenum disulfide, nanodiamond, graphite, tungsten disulfide, hexagonal boron nitride, nanoparticles of materials with lamellar structure, and nanoparticles of soft metals, and combinations thereof.

5. The nanofluid according to claim 3, wherein the nanoparticle concentration is from 0-15% by weight based on the weight of the nanofluid.

6. A method of preparing a gelling nanofluid, the method comprising the steps of:
   preparing an organogel containing a base fluid, cetyl alcohol, and a gelling agent, combining the organogel with a nanoparticle component, to form a gelling nanofluid; and
   cooling the gelling nanofluid to a temperature of less than 25° C., which changes from a liquid state to a gelled state at temperatures below 25° C., the gelled state helping to maintain the nanoparticle component suspended throughout the base fluid,
   wherein the concentration of cetyl alcohol in the organogel is 1% to 15% by weight based on the total weight of the organogel,
   the concentration of the gelling agent in the organogel is 0.1% to 2% by weight based on the total weight of the organogel,
   the concentration of the base fluid in the organogel is 83% to 98.9% by weight based on the total weight of the organogel,
   the base fluid in the organogel is 2-hexyl-1-decanol or 2-n-octyl-1-dodecanol, and
   the gelling agent is sodium oleate.

7. The method according to claim 6, wherein the nanoparticle component is selected from the group consisting of molybdenum disulfide, nanodiamond, graphite, tungsten disulfide, hexagonal boron nitride, nanoparticles of materials with lamellar structure, and nanoparticles of soft metals, and combinations thereof.

8. The method according to claim 6, wherein the nanoparticle concentration is from 0-15% by weight based on the weight of the nanofluid.

\* \* \* \* \*